Oct. 7, 1924.  
E. J. BAISDEN  
CHILD'S VEHICLE  
Filed Dec. 26, 1922
1,510,491
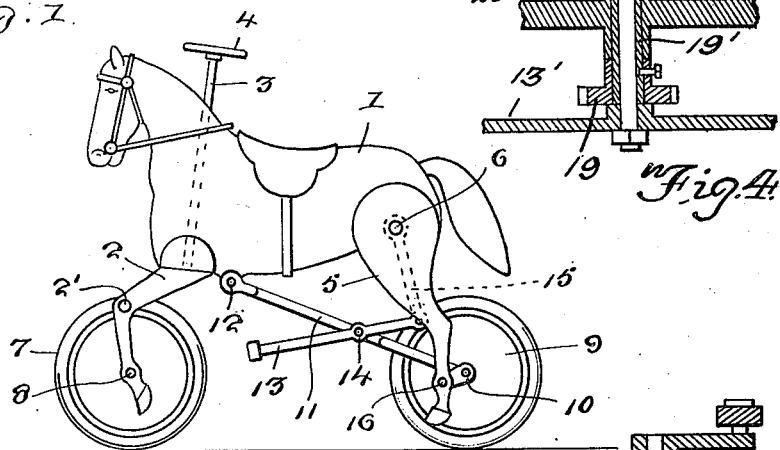
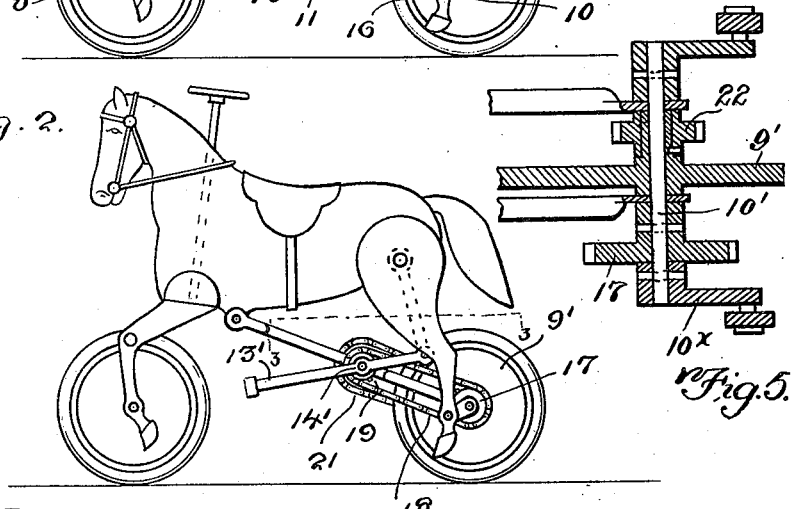
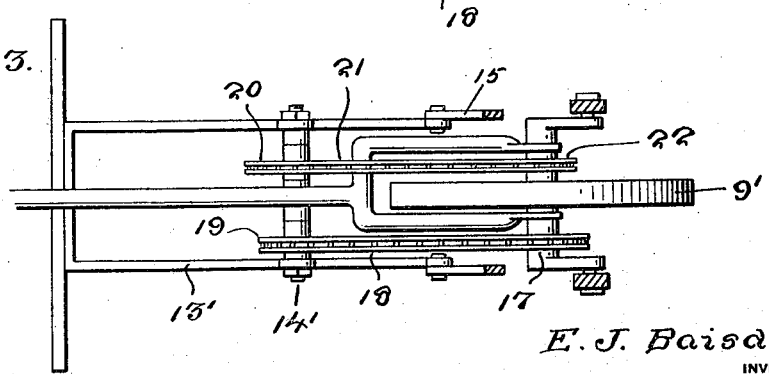
E. J. Baisden
INVENTOR
BY Victor J. Evans
ATTORNEY
WITNESS:
E. Q. Ruppert.

Patented Oct. 7, 1924.

1,510,491

UNITED STATES PATENT OFFICE.

EDWARD J. BAISDEN, OF NEW YORK, N. Y., ASSIGNOR, BY MESNE ASSIGNMENTS, OF ONE-HALF TO GEORGE E. GREY AND ONE-HALF TO GERRIT J. LLOYD, BOTH OF NEW YORK, N. Y.

CHILD'S VEHICLE.

Application filed December 26, 1922. Serial No. 609,032.

*To all whom it may concern:*

Be it known that I, EDWARD J. BAISDEN, a citizen of the United States, residing at New York city, in the county of New York and State of New York, have invented new and useful Improvements in Children's Vehicles, of which the following is a specification.

This invention relates to a child's vehicle, the general object of the invention being to attach a crank to one wheel and to provide a pedal arrangement for lifting a part of the vehicle to give the crank a half revolution, the weight of the rider giving the crank the other half revolution so that the vehicle is given an up and down movement as it travels along.

Another object of the invention is to so arrange the parts that the vehicle can be propelled without using the pedal arrangement by a rocking movement of the body of the rider thereon.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is an elevation of the invention.

Figure 2 is a similar view but showing a modification.

Figure 3 is an enlarged sectional view on the line 3—3 of Figure 2.

Figure 4 is a sectional view through the pivot shaft 14'.

Figure 5 is a sectional view through the crank shaft.

In these views 1 indicates the body of the vehicle which is made to represent an animal, preferably a horse. The front legs 2 are connected with the body so that they can be rotated about a vertical axis by means of the steering rod 3 and the handle 4, thus permitting the device to be steered. The rear legs 5 are pivoted to the body by the pin 6 and the front wheel 7 is pivoted between the front legs, as shown at 8, while the rear wheel 9 is connected with the rear legs by the crank shaft 10. Thus as the vehicle is moved along its rear end will be given an up and down movement by the revolving crank shaft. A forked bar 11 has its forked end connected with the crank shaft and its other end is pivotally connected with the under part of the body as shown at 12.

The vehicle can be propelled by a rocking movement of the rider thereon, such movement simulating the movement of a jockey on a real horse, but I provide means for giving the crank shaft its upward movement for facilitating the propulsion of the device. Such means consists of the pedal bars 13 which are pivoted to the member 11, as shown at 14 and which have their rear ends connected with the pivot pin 6 by means of the links 15. This arrangement of parts will permit the rider to raise the rear part of the horse and thus give the crank shaft its upward movement, the weight of the rider causing the crank shaft to complete its revolution. Thus the vehicle is propelled and at the same time its rear part is given an up and down movement so that the device gives the same action as a real horse.

Figures 2, 3, 4 and 5 show the device driven through means of chains and sprockets. In this form of the invention the shaft 10', which has connected therewith the cranks 10ˣ, has secured thereto a sprocket 17 which is connected by the chain 18 with a sprocket 19, fastened to a sleeve 19' rotatably arranged on the pivot shaft 14' for the pedal levers 13'. A sprocket 20 is also secured to said sleeve 19' and this sprocket is connected by a chain 21 with a sprocket 22 which is fastened to the hub of the rear wheel 9', which wheel is rotatably mounted on the shaft 10. Thus the movement of the crank shaft is transmitted to the wheel through the chains and sprockets which permits the device to be geared for any desired speed by changing the sprocket wheels.

Foot rests 2' are arranged on the front legs.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described comprising a body, a front wheel for the same, a rear wheel, a crank shaft connecting the rear wheel with the body, a support under the body, a pedal bar pivoted to the support and a link connecting the pedal bar with the rear of the body for permitting the body to be raised by depressing the pedal bar.

2. A device of the class described comprising a figure of an animal, means for moving the front legs of the figure to steer the device, the rear legs being pivoted to the body of the figure, a front wheel carried by the front legs, a crank shaft rotatably connected with the rear legs, a rear wheel carried by the crank shaft, a bar connecting the crank shaft with the lower part of the body, a pedal bar pivoted to the first mentioned bar and a link connecting the rear end of the pedal bar with the rear part of the body.

3. A device of the class described comprising a figure of an animal, means for moving the front legs thereof to steer the device, means for pivoting the rear legs to the body, a front wheel arranged between the front legs, a crank shaft pivoted to the rear legs, a rear wheel on the crank shaft, a bar connecting the crank shaft with the lower part of the body, gears connecting the crank shaft with the rear wheel, and a pedal arrangement carried by the bar for raising the rear part of the animal to give the crank shaft its upward movement.

In testimony whereof I affix my signature.

EDWARD J. BAISDEN.